(12) United States Patent  
Müller

(10) Patent No.: US 10,291,461 B2  
(45) Date of Patent: May 14, 2019

(54) SECURE GATEWAY

(71) Applicant: MB connect line GmbH, Dinkelsbühl (DE)

(72) Inventor: Siegfried Müller, Dinkelsbühl (DE)

(73) Assignee: MB connect line GmbH Fernwartungssysteme, Dinkelsbühl (DE)

( * ) Notice: Subject to any disclaimer, the term of this patent is extended or adjusted under 35 U.S.C. 154(b) by 84 days.

(21) Appl. No.: 15/476,996

(22) Filed: Apr. 1, 2017

(65) Prior Publication Data

US 2017/0288938 A1 Oct. 5, 2017

(30) Foreign Application Priority Data

Apr. 4, 2016 (DE) .......................... 10 2016 106 129  
Apr. 21, 2016 (DE) .......................... 10 2016 107 450  
Mar. 31, 2017 (EP) ..................................... 17164443

(51) Int. Cl.  
*H04L 12/66* (2006.01)  
*H04L 29/06* (2006.01)  
(Continued)

(52) U.S. Cl.  
CPC ........ *H04L 29/06224* (2013.01); *H04L 12/66* (2013.01); *H04L 63/02* (2013.01);  
(Continued)

(58) Field of Classification Search  
CPC ..... H04L 12/66; H04L 63/02; H04L 63/1416; H04L 63/1458; H04L 63/1466  
See application file for complete search history.

(56) References Cited

U.S. PATENT DOCUMENTS 5,661,786 A 8/1997 Horn  
7,170,854 B1 * 1/2007 Orrell ................... H04L 49/208  
                                                                  370/218

(Continued)

*Primary Examiner* — Charles C Jiang  
*Assistant Examiner* — Ryan C Kavleski  
(74) *Attorney, Agent, or Firm* — Bryan W. Bockhop; Bockhop Intellectual Property Law, LLC

(57) ABSTRACT

Gateway device (100), adapted to couple a first network with a second network, comprising: a first network interface device (102) coupled by a first interface to a first network and having a second interface; a second network interface device (104) coupled by a first interface with the second network and having a second interface; a network coupling device (103) adapted to transmit in a first status no data from the second interface of the second network interface device (104) to the second interface of the first network interface device (102) on the physical layer and adapted to transmit in a second status data from the second interface of the first network interface device (102) to the second interface of the second network interface device (104); wherein said network coupling device (103) includes a switching device (126, 128) coupled to a conductor (130, 134) coupling the second interface of the first network interface device (102) and second network interface device (104); wherein the switching device (126, 128) is connected such to the conductor (130, 134) that the conductor can not transmit data in a first state of the switching device and that the conductor can transmit data in a second state of the switching device and wherein said switching device (126, 128) is controlled by a manual switch (127) operated by a user.

10 Claims, 2 Drawing Sheets

(51) Int. Cl.
*H04L 29/08* (2006.01)
*H04Q 3/00* (2006.01)
*G05B 19/418* (2006.01)

(52) U.S. Cl.
CPC ...... *H04L 63/1416* (2013.01); *H04L 63/1458* (2013.01); *H04L 63/1466* (2013.01); *H04L 67/1036* (2013.01); *H04Q 3/0025* (2013.01); *G05B 19/4185* (2013.01); *G05B 2219/31348* (2013.01); *H04L 67/28* (2013.01); *Y02P 90/18* (2015.11)

(56) References Cited

U.S. PATENT DOCUMENTS

| | | | |
|---|---|---|---|
| 7,725,635 B2* | 5/2010 | Wei | H04L 12/40143 709/225 |
| 7,801,162 B2* | 9/2010 | Jeon | H04L 12/66 370/402 |
| 2008/0304655 A1 | 12/2008 | Lautenschlager | |
| 2010/0235561 A1* | 9/2010 | Goldring | G06F 13/385 710/315 |
| 2012/0030768 A1 | 2/2012 | Mraz et al. | |

* cited by examiner

SECURE GATEWAY

CROSS-REFERENCE TO RELATED APPLICATION(S)

This application claims the benefit of the following patent applications, the entirety of each of which is hereby incorporated herein by reference:

| Country | Application No. | Filing Date |
| --- | --- | --- |
| Germany (DE) | 10 2016 106 129.8 | Apr. 4, 2016 |
| Germany (DE) | 10 2016 107 450.0 | Apr. 21, 2016 |
| Europe (EP) | 17164443.8 | Mar. 31, 2017 |

BACKGROUND OF THE INVENTION

1. Field of the Invention

The present invention relates to a secure network gateway, particularly a gateway with which a manufacturing site may be connected to a wide area network, such as to the internet.

For monitoring manufacturing processes it is required that the manufacturing equipment regularly transmits data to a predefined storage outside the manufacturing site. Such data is stored in the cloud, i.e. a protected memory, which may be accessed by the internet.

2. Description of the Related Art

It is to be understood that the manufacturing site must be protected against attacks from the internet. Prior art methods can only protect the connection, i.e. the physical link of the production site to the internet from unauthorized external access with a big effort. An unauthorized external access (attack) introduces the danger that data of the apparatus in the production site is amended and that the production process can be distorted thereby. Further, by wrong production data, workpiece and apparatus of the production site may be damaged.

The prior art proposes use of so-called data diodes as gateways for avoiding unauthorized external access to the production sites. Data diodes achieve inter alia the function of a so-called firewall. The data diodes of the prior art use software having a complex right management and use essentially application specific measures. Such software is intricate to administer. Further, the software of such gateway has to be updated regularly.

DE 10 2013 016 943 A1 discloses a cloud server for automation environments with a firewall. The security regime of the cloud server has to be secured by rules parameterized by software.

Therefore, there is a need for an improved gateway.

SUMMARY OF THE INVENTION

The object of the invention is achieved by a gateway apparatus according to claim 1 and a production equipment according to claim 10. The depending claims are directed to preferred embodiments.

The inventive gateway apparatus is adapted to couple a first network with a second network. The first network may be a network of a production site. The second network may be a protected company network. The second network may be coupled to a wide area network such as the internet. The second network may comprise a so-called cloud storage accessible by the internet to store the data in the cloud storage or to read it therefrom.

The gateway apparatus further comprises a first network interface device coupled by a first interface to the first network and having a second interface. The first gateway device further comprises a second network interface device coupled by a first interface to the second network and having a second interface. The network apparatus further comprises a network coupling device adapted to transmit in a first status no data on the physical layer from the second interface of the second network interface device to the second interface of the first network interface device and adapted to transmit in a second status data from the second interface of the first network interface device to the second interface of the second network interface device. The network coupling device can not or must not transmit any data in the first status on the circuit layer (physical layer) from the second network interface device to the first network interface device.

Said network coupling device includes a switching device coupled to a conductor coupling the second interface of the first network interface device and second network interface device. The switching device is connected such to the conductor that the conductor can not transmit data in a first state of the switching device and that the conductor can transmit data in a second state of the switching device. Said switching device is controlled by a manual and/or mechanical switch operated by a user. The manual and/or mechanical switch may be directly coupled by at least one electric or optical conductor with the switching device.

Since the transmission of a data in the production site is blocked on the circuit layer and hardware layer, respectively the gateway apparatus is particularly secure, since no software is used that may be manipulated. Further, no errors may occur to false configuration of the firewall software or configuration software.

The layer 1 of the OSI reference model of the network coupling device may be adapted to transmit in the first status no data from the second network interface device to the first network interface device. The OSI reference model is known to the person skilled in the art. Layer 1 relates to the lowest transmission layer, such as the hardware layer and the bit transmission layer. If the hardware layer and the lowest bit transmission layer cannot transmit any data from the second network interface device to the first network interface device, a security software, firewall software or the like cannot be manipulated such that nevertheless data can be transmitted from the second network interface device to the first network interface device. Thereby, a secure gateway device is provided.

Alternatively or additionally, the second interface of the first network interface device may be adapted such that data may be only received, but that no data can be transmitted. The second interface of the first network interface device can only receive data in the first status from the network coupling device. By such measures, a redundancy for preventing of transmission of data from the second interface device to the first interface device is created.

The network coupling device may comprise a first conductor via which commands and/or data from the second network interface device is transmitted to the first interface device. A switching device may be arranged in the first conductor which causes in its open state the first status of the network coupling device, in which no data can be transmitted from the second interface device to the first interface device. The first conductor may be a command line and/or a data line. If such conductor is interrupted due to the open state of the switching device, no commands and/or no data can be transmitted on the physical layer and hardware layer, respectively from the first network interface device to the second network interface device. In its closed status the switching device causes the second status of the network coupling device, in which the data from the second network interface device can be transmitted to the first network interface device.

A switching device may comprise a mechanical switch or a remotely operated switch such a relay. The remotely operated switch may be controlled by a controller that is not part of the operation software of the gateway device. Thereby the security of the gateway device can be increased. For reasons of security, a mechanical switch is preferred, since it can only be operated by a person that has physical access to the gateway device. The switch can be secured by a lock.

In one embodiment the network coupling device may be a serial interface, a serial bus or a serial data transmission device. The serial data transmission has the advantage that the switching device needs only be arranged in one control conductor and/or one data conductor to interrupt such conductor.

In one embodiment the network coupling device may comprise a parallel interface, such as a parallel bus. In this embodiment the switching device may be arranged in a write control conductor, such as the write enabled conductor.

To the first interface of the first network interface device a plurality of network notes may be connected. The first interface of the first network interface device may support PROFIBUS, PROFINET, Ethernet, an industrial Ethernet, CAN, EtherCAT and/or an arbitrary network protocol or bus protocol in a manufacturing environment.

A network may be connected to the first interface of the second network interface device, wherein the first interface of the second network interface device may support a LAN protocol, a WLAN protocol, a mobile radio protocol and/or an arbitrary WLAN protocol. The first interface of the second network interface device may be connected to the internet directly or by a network, such as a router. The first interface of the second network interface device may be connected with a so-called cloud storage for storage of data.

The first network interface device may comprise a field bus processor. The field bus processor may be arranged to convert busses connected to the first interface into a common format that is output and the second interface. The field bus processor may convert data structures and/or control information.

The gateway device may be configured to convert a protocol of a first interface of the first interface device into a protocol of the first interface of the second interface device. Optionally, the gateway device may be arranged to convert the protocol of the first interface of the second interface device to a protocol of the first interface of the first interface device. The network coupling device may use a common protocol.

The invention also relates to a manufacturing apparatus comprising the above gateway device. To the first interface of the first network interface device at least one production device may be connected. The manufacturing device may be a production control station, a control device, a memory programmable controller, a computer, a measuring device, an industrial control system, a data base for a production apparatus, a machine, a sensor or the like.

The first interface of the second interface device may be coupled with the internet.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

BRIEF DESCRIPTION OF THE FIGURES OF THE DRAWINGS

The invention is now explained in further detail by an exemplary and non-limiting embodiment under reference to the enclosed figures, wherein.

DETAILED DESCRIPTION OF THE INVENTION

Figure 1:
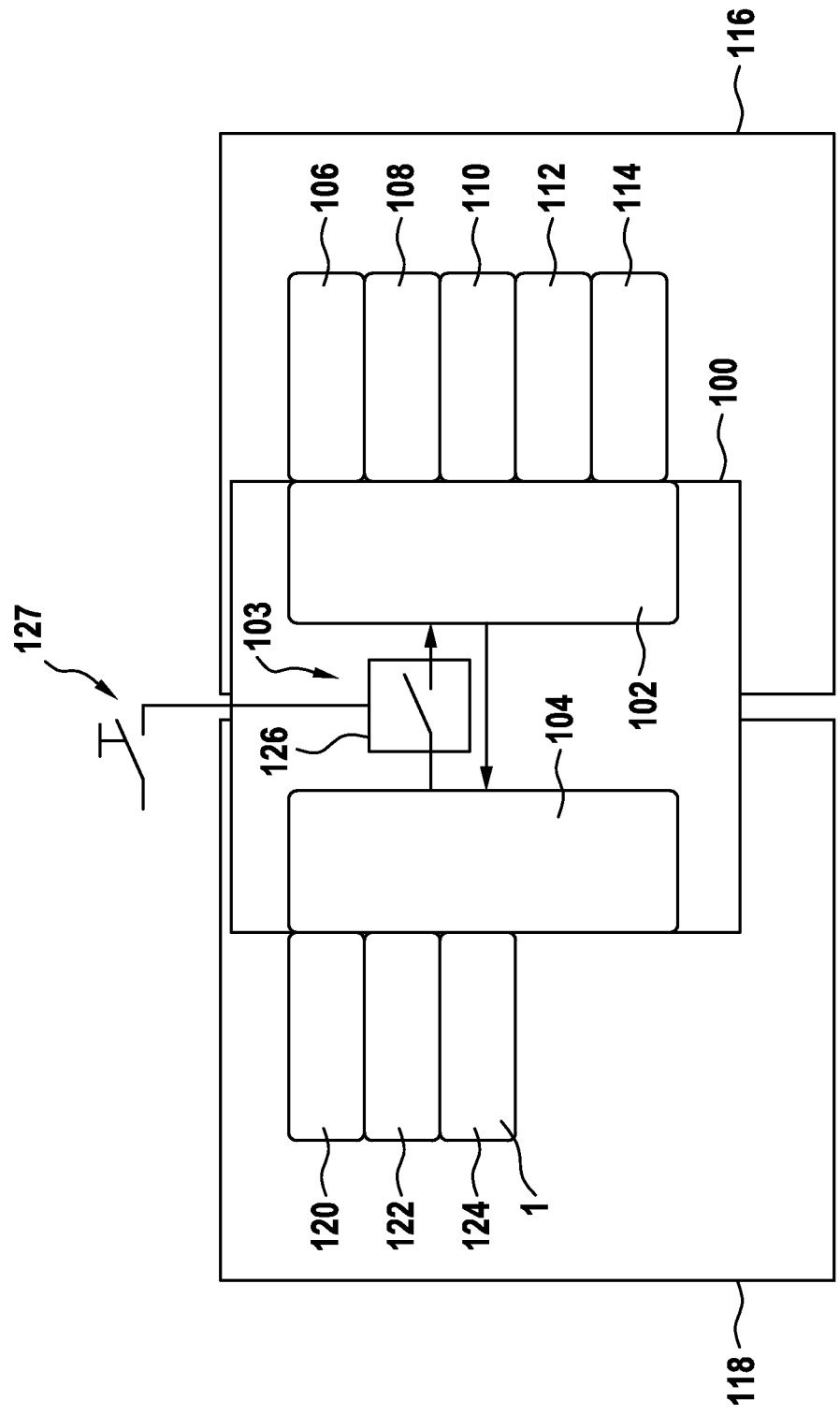
FIG. 1 is a schematic representation of the gateway device according to the present invention.

A preferred embodiment of the invention is now described in detail. Referring to the drawings, like numbers indicate like parts throughout the views. Unless otherwise specifically indicated in the disclosure that follows, the drawings are not necessarily drawn to scale. As used in the description herein and throughout the claims, the following terms take the meanings explicitly associated herein, unless the context clearly dictates otherwise: the meaning of "a," "an," and "the" includes plural reference, the meaning of "in" includes "in" and "on." Also, as used herein, "global computer network" includes the Internet.

FIG. 1 shows a gateway device 100 located at a transition from a production site 116 to an environment 118 with a wide area network. The gateway device 100 comprises a first interface device 102, a second interface device 104 and a network coupling device 103.

The first network interface device 102 comprises a first interface comprising a plurality of connections for network members located in the production environment 116. The first network device may comprise an interface for a PROFIBUS 106, an interface for a PROFINET 108, an interface for a Ethernet 110, an interface for an industrial Ethernet 110, and interface for a CAN bus 112 and/or an interface for an EtherCAT 114. It is to be understood that the first interface is configured such that an arbitrary field bus, an arbitrary network and particularly field buses under future developments, networks and the future development or the same may be connected to the first interface. The production environment may comprise a plurality of production devices connected to the first interface of the first network interface apparatus 102. The production device may be a data control station, a data base for a production apparatus, a machine, a sensor or the like. The second network interface device may comprise to an arbitrary wide area network, company network or the like. The wide area network may be the internet.

To the wide area network a so-called cloud storage may be connected in which data from the production environments 116 are stored. The second network interface device 104 may comprise an interface for a LAN 120, a WLAN 122, a mobile radio network 124 or an arbitrary other wide area network.

The first network interface device 102 and the second network interface 104 are coupled by a networks coupling device 103. The Gateway device 100 is arranged to convert the protocol of an arbitrary interface at the first interface device 102 in an arbitrary protocol of a second interface device 104 and optionally vice versa. In the networks coupling device 100 common protocols may be used.

The networks coupling device is arranged such that it allows in the first status only a data transmission from the first network interface device 102 to the second network interface device 104. The circuit of the networks coupling device is arranged such that in layer 1 merely data from the first network interface device 102 to the second network interface device 104 can be transmitted. In one embodiment the network coupling device 103 may be a serial bus, a serial network node and/or a serial interface. The circuit of the network coupling device 103 may be arranged such that the second network interface device 104 cannot transmit any commands for sending of data to the first network interface device 102. Further, the circuit of the network coupling device 103 can be arranged such that the second network interface device 104 cannot transmit any data bits to the first network interface device 102, if the network coupling device 103 is in its first status.

As is shown in FIG. 1 the network coupling device 103 may comprise a switching device 126 located in a conductor transmitting commands from the second network interface device 104 to the first network interface device 102. Alternatively or additionally, in the switching device 126 a conductor may be arranged transmitting data from the second network interface device 104 to the first network interface device 102. As long as the switching device 126 is open the network coupling device 103 is in its open status. No commands and no data can be transmitted from the second network interface device 104 to the first network interface device 102. FIG. 1 shows the first status during normal operation (production).

The switching device 126 may comprise a semiconductor switch, such as a transistor, MOS transistor, CMOS transistor, bipolar transistor or the like. The switching device 126 may comprise an optical coupler for coupling into the conductor. The switching device and semiconductor switch, respectively is controlled by the manual and/or mechanical switch 127. The manual and/or mechanical switch 127 can only be operated by a user that has physical access to the gateway device 100. The manual an/or mechanical switch 127 may be secured by a lock.

The manual and/or mechanical switch 127 may be connected by at least one wire directly with the switching device 126. Preferably, the manual and/or mechanical switch 127 and the switching device 126 may be located in the same housing. The housing may be the housing of the network coupling device 103 and/or the secure gateway 100.

In another embodiment, the manual and/or mechanical switch 127 may be the switching device in the conductor transmitting commands and/od data.

Figure 2:
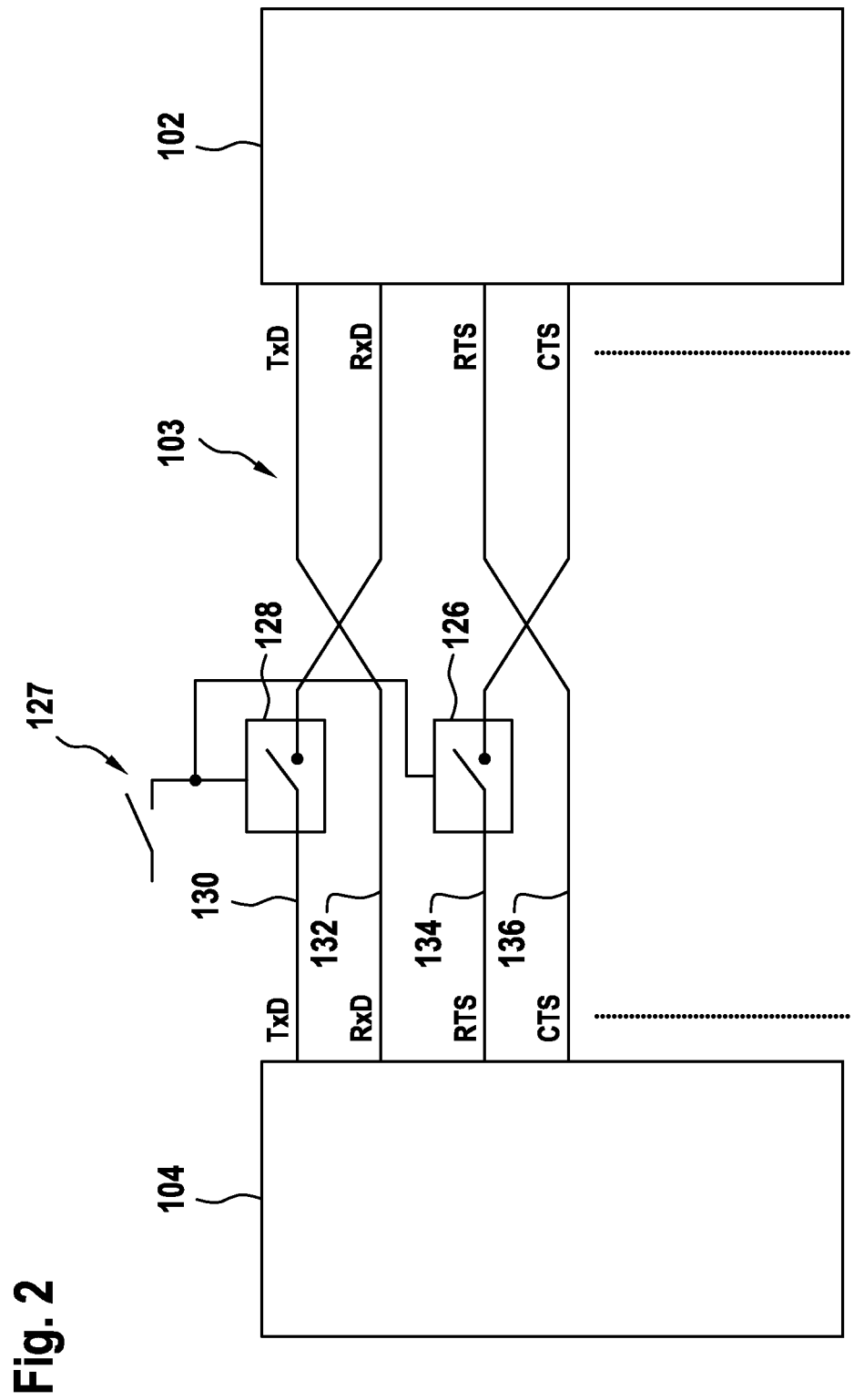
FIG. 2 is an exemplary embodiment of a serial interface embodying a network coupling device.

Reference is made to FIG. 2 showing an exemplary embodiment of the network coupling device 103, particularly a serial bus. The function and structure of a serial bus is known to the person skilled in the art. Consequently, only these elements of a serial bus are depicted necessary for understanding of the invention.

The network coupling device 103 transmits data from the first network interface device 102 to the second network device 104 over a second data conductor 132.

In the following the network coupling device 103 is described in a case, in which data is transmitted from the second network interface device 104 to the first network interface device 102. Data is transmitted from the second network interface device 104 to the first network interface device 102. Over the second conductor 132 data is transmitted from the first network interface device 102 to the second network interface device 104. If the second network interface device 104 shall transmit data to the first network interface 102, the second network interface device 104 indicates by a command on the third conductor 134 that data are to be transmitted from the second network interface device 104 to the first interface device 102. If the first network interface device 102 shall transmit data to the second network interface device 104 an indication is sent as a command on the fourth conductor 136.

In the embodiment of the network coupling device 103 shown in FIG. 2 data may be transmitted from the first network interface device 102 to the second network interface device 104, since the second conductor for transmitting data and the fourth conductor 136 for transmission of commands are connected from the first network interface device 102 without interruption to the second network interface device 104.

In the first conductor 130 an optional second switching device 128 is arranged. In this third conductor 134 a second switching device 126 is arranged. In the status shown in FIG. 2 the first switching device 126 and the second switching device 128 are opened. Accordingly, the second network interface device 104 cannot transmit commands to the first network interface device 102. FIG. 2 shows the first status during normal operation (production).

The switching device 126 may comprise a semiconductor switch, such as a transistor, MOS transistor, CMOS transistor, bipolar transistor or the like. The switching device 126, 128 may comprise an optical coupler for coupling into the conductor. The switching devices 126, 128 and semiconductor switches, respectively are controlled by the manual and/or mechanical switch 127. The mechanical switch 127 can only be operated by a user that has physical access to the gateway device 100. The mechanical switch 127 may be secured by a lock.

The manual and/or mechanical switch 127 may be connected by at least one wire directly with the switching devices 126, 128. Preferably, the manual and/or mechanical switch 127 and the switching devices 126, 128 may be located in the same housing. The housing may be the housing of the network coupling device 103 and/or the secure gateway 100.

As soon as the first switching device 126 and the second switching device 128 are closed by operating the manual (mechanical) switch 127, the second network interface device 104 can transmit data and commands to the first network interface device 102. This status is termed the second status. The second status may be desired by a setup operation, in which parts of the manufacturing environment 116, for example single machines, coupled with the first network coupling device are to be administered and/or configured.

The first switching device 126 and the second switching device 128 may be configured as a mechanical switch or an electromechanical switch, such as a relay. For reasons of security a mechanical switch is preferred, since it can only be operated by persons having physical access to the gateway device. The switch may be secured by a lock.

The invention has been described with reference to a serial transmission in more detail. It is to be understood that the principles shown in the description of the figures may also be applied to a parallel interface. The switching device 126 may be arranged in such embodiment in a command conductor of the parallel interface.

The present invention provides an improved gateway device ensuring that data can be transmitted only unidirectional from the manufacturing environment 116 into an comparably open network environment. The data may be transmitted from the production environment 116 to a cloud storage, for example. The data in the cloud storage may be retrieved from other programs for administering. The invention ensures that no abusive commands can be transmitted to elements of the production environment 116, whereby the production environment may be distorted. Thereby, a protection of manufacturing environment 116 against third party attacks may be insured.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A gateway device, configured to couple a first network with a second network, comprising:
    a first network interface device coupled by a first interface to a first network and having a second interface,
    a second network interface device coupled by a first interface with the second network and having a second interface,
    a network coupling device configured to transmit no data from the second interface of the second network interface device to the second interface of the first network interface device on a physical layer while in a first status and configured to transmit data from the second interface of the first network interface device to the second interface of the second network interface device on a physical layer while in a second status;
    wherein said network coupling device includes a switching device coupled to a conductor coupling the second interface of the first network interface device to the second network interface device;
    wherein the switching device is connected to the conductor so that the conductor cannot transmit data in a first state of the switching device and so that the conductor can transmit data in a second state of the switching device; and
    wherein said switching device is controlled by a manual switch operated by a user, wherein the network coupling device comprises a first conductor via which commands and/or data are transmitted from the second network interface device to the first network interface device, wherein the switching device is arranged in the first conductor, the switching device causing the first status of the network coupling device while being in an open state, and causing the second status of the network coupling device while being in a closed state.

2. The gateway device according to claim 1, wherein a layer 1 of an Open System Interconnection (OSI) reference model of the network coupling device is configured to transmit in the first status no data from the second network interface device to the first network interface device.

3. The gateway device according to claim 1, wherein the switching device comprises a device selected from a list of devices consisting of:
    a pull up device coupling the conductor to a positive supply voltage;
    a pull down device coupling the conductor to ground;
    a pull down device coupling the conductor to a negative supply voltage; and
    a pull up device coupling the conductor to ground.

4. The gateway device according to claim 1, wherein the network coupling device is selected from a list of devices consisting of: a serial interface, a serial bus, and a serial data transmission device.

5. The gateway device according to claim 1, wherein a plurality of network members may be connected to the first interface of the first network interface device, wherein the first interface of the first network interface device supports at least one protocol selected from a list of protocols consisting of:
    PROFIBUS;
    PROFINET;
    Ethernet;
    Industrial Ethernet
    CAN; and
    EtherCAT.

6. The gateway device according to claim 1, wherein at least one network may be connected to the first interface of the second network interface device and wherein the first interface of the second network interface device supports at least one protocol selected from a list of protocols consisting of:
    LAN;
    WLAN
    a mobile radio protocol; and
    a WLAN protocol.

7. The gateway device according to claim 1, wherein the first network interface device comprises a field bus processor.

8. The gateway device according to claim 1, wherein the gateway device is configured to convert a protocol of a first interface of the first interface device to a protocol of the first interface of the first interface of the second interface device.

9. The gateway device according to claim 1, further comprising at least one manufacturing device connected to the first interface of the first network interface device.

10. The gateway device according to claim 9, wherein the first interface of the second network interface device is connected to the Internet.

* * * * *